April 24, 1962 V. B. HIBBERT 3,030,920
HAY STACK FEEDER
Filed July 5, 1960
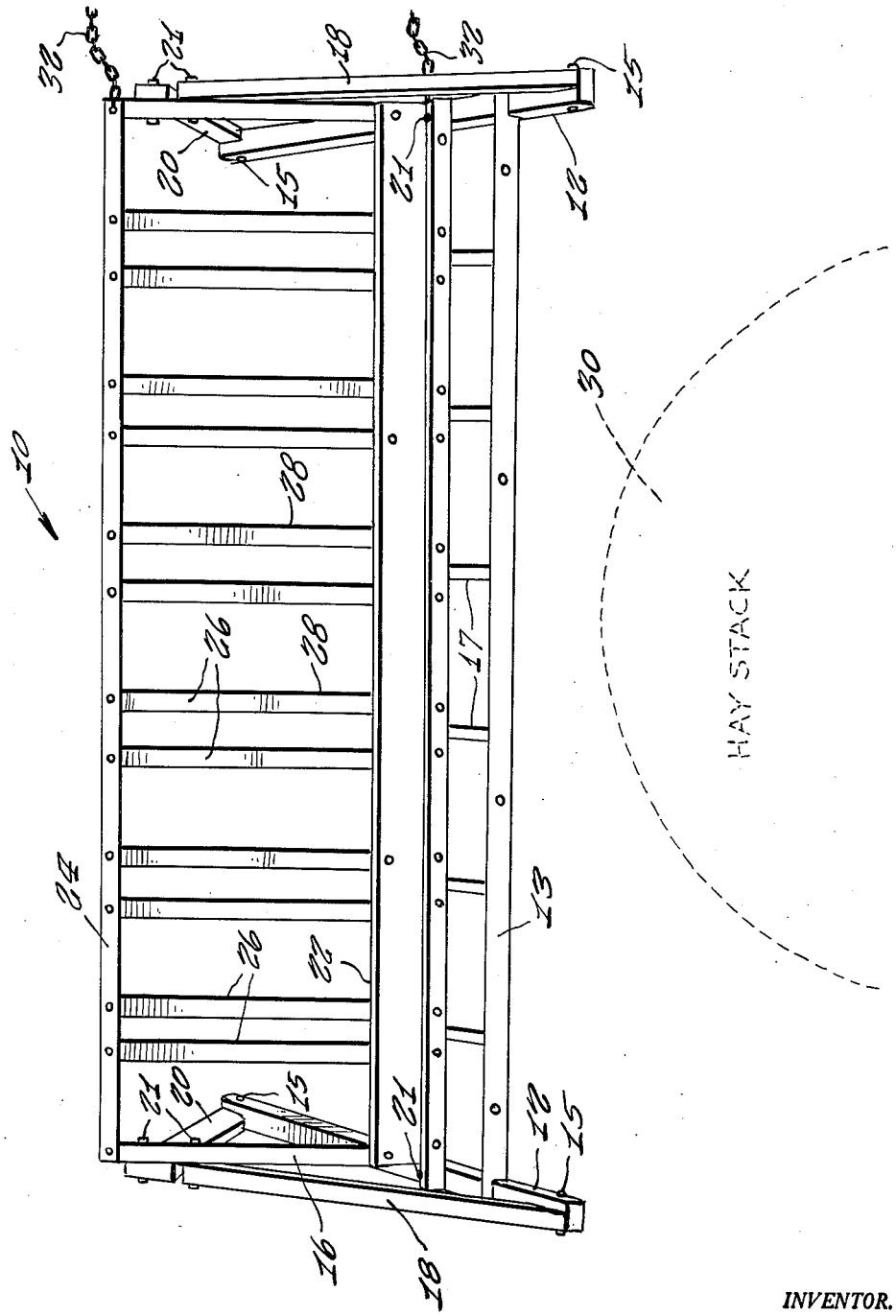
INVENTOR.
Virgil B Hibbert

United States Patent Office 3,030,920
Patented Apr. 24, 1962

3,030,920
HAY STACK FEEDER
Virgil B. Hibbert, Kyle, S. Dak.
Filed July 5, 1960, Ser. No. 40,814
1 Claim. (Cl. 119—60)

This invention relates to animal feeding devices and more particularly to a hay stack feeder.

It is an object of the present invention to provide a device for controlling the feeding of livestock, which will prevent waste and which will provide individual feeding stations for a large number of animals.

Still another object of the present invention is to provide a hay stack feeder of the above type which can be used in conjunction with other similar devices for large feeding areas.

Other objects of the invention are to provide a hay stack feeder bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

The FIGURE is a perspective view of a hay stock feeder made in accordance with the present invention in actual use.

Referring now more in detail to the drawing, a hay stack feeder 10 made in accordance with the present invention is shown to include a base consisting of a longitudinal ladder type frame 13 having cross pieces 17 and with a transverse end piece 12 at each end. A pair of upwardly and inwardly inclined frame elements 16, 18 are secured at each of their lower ends to the outer ends of the cross bar 12, such as by bolts 15. The uppermost ends of the frame members 18, 20 are secured, such as by bolts 21, to the opposite longitudinal extremities of a barrier frame 24 which is further anchored at its lower end by means of bolts 21 to a central portion of each of the transverse base members 12.

The barrier 24 is provided with a plurality of longitudinally spaced apart pairs of cross bars 26 that define spaced apart feeding stations 28 through which the livestock may extend their heads. Thus, with the device placed adjacent to the foot of a hay stack, the continuous reaching of the livestock through the barrier 24 will automatically cause the feeder to move inwardly relative to the hay stack, under the power supplied by the livestock, thus keeping the haystack in uniform shape at all times.

In the event that it is desired to use a number of these feeders 10 for larger feeding areas, end chains 32 carried by one end of each such feeder may be used to connect to the adjacent end of a next adjacent feeder, thus enabling the feeders to be placed in any desired arrangement around a hay stack 30. Of course, the end pieces 12 are adapted to slide along the ground and are sufficiently long enough to provide a staple support for the entire assembly at all times.

While various changes may be made in the detail construction, it shall be understood that such changes shall be within the spirit and scope of the present invention as defined by the appended claim.

What I claim as new and desire to protect by Letters Patent of the United States is:

A haystack feeder for livestock comprising in combination a base, said base comprising a longitudinal, ladder-like element having a pair of longitudinal beams in spaced relationship and a plurality of transverse cross pieces between said beams, a transverse end piece secured at each longitudinal extremity of said longitudinal ladder-like element, each of said transverse end pieces constituting a runner supported on the ground for sliding the feeder therealong, a barrier mounted upon said base to engage a haystack, said barrier comprising a substantially rigid frame secured in obliquely inclined relationship upon said base and a pair of upwardly converging frame members secured to each of said transverse end pieces and connected to the respective ends of said barrier for maintaining said barrier in said angularly inclined position upon said base, said barrier having separators defining a plurality of feeding stations, said separators comprising a plurality of longitudinally spaced pairs of cross bars defining a plurality of longitudinally placed feeding stations for receiving the heads of livestock therethrough, and said cross bars of said barrier being in fixed position relative to each other and subregistering with the cross pieces of the ladder-like base.

References Cited in the file of this patent
UNITED STATES PATENTS

| | | |
|---|---|---|
| 445,162 | Coffin et al. | Jan. 27, 1891 |
| 1,433,777 | Brown | Oct. 31, 1922 |